United States Patent [19]

McLain

[11] 3,901,430
[45] Aug. 26, 1975

[54] PROCESS FOR MAKING WELDED CORRUGATED TUBE

[75] Inventor: Charles D. McLain, Alton, Ill.

[73] Assignee: Olin Corporation, New Haven, Conn.

[22] Filed: July 2, 1974

[21] Appl. No.: 485,093

Related U.S. Application Data

[63] Continuation of Ser. No. 388,837, Aug. 16, 1973, which is a continuation of Ser. No. 218,422, Jan. 17, 1972, abandoned.

[52] U.S. Cl. .................................................. 228/146
[51] Int. Cl.² ........................................ B21D 39/00
[58] Field of Search.... 29/157.3 R, 475, 477, 477.3, 29/477.7, 482, 483, 202 R; 113/1 C, 116 B, 116 UT, 118 D

[56] References Cited
UNITED STATES PATENTS

| | | | |
|---|---|---|---|
| 1,486,977 | 3/1924 | Lindgren | 113/116 UT |
| 3,037,105 | 5/1962 | Kohler | 219/8.5 |
| 3,075,484 | 1/1963 | Benteler | 29/477 |
| 3,487,537 | 1/1970 | Lombardi | 29/477.7 |
| 3,722,075 | 3/1973 | Fay | 29/477 X |

Primary Examiner—Donald G. Kelly
Assistant Examiner—Margaret M. Joyce
Attorney, Agent, or Firm—Robert H. Bachman; Joseph Fleischer

[57] ABSTRACT

A heat exchanger tube having a corrugated wall with longitudinally extending corrugations and a process and apparatus for making such tube. The tube is formed from corrugated metal strip which is formed and welded into a tube. The resulting tubing has a longitudinally extending weld seam and portions of the tube surface coextensive with the weld seam on either side thereof are left uncorrugated.

7 Claims, 6 Drawing Figures

PROCESS FOR MAKING WELDED CORRUGATED TUBE

This is a Continuation, of application Ser. No. 388,837, filed Aug. 16, 1973, which in turn is a continuation of application Ser. No. 218,422, filed Jan. 17, 1972, now abandoned.

BACKGROUND OF THE INVENTION

This invention deals with a heat exchanger tube having a corrugated wall with longitudinally extending corrugations and a process and apparatus for making such a tube. The tube is formed from corrugated metal strip which is formed into the shape of a tube having longitudinally extending edges which are welded together to form a fluid and pressure tight tube. Preferably, the tubing in accordance with this invention is welded by a process of high frequency forge welding. The resulting tubing has a longitudinally extending weld seam and portions of the tube surface coextensive with the weld seam and on either side of the weld seam are left uncorrugated.

The tubing in accordance with this invention is similar to that disclosed in U.S. Pat. No. 3,244,601, granted Apr. 5, 1966. A typical prior art method of forming the tubing of the above referenced patent is set forth in U.S. Pat. No. 3,407,638, granted Oct. 29, 1968.

In this prior art process, a toothed mandrel is placed within the tube and a plurality of tooth dies rotate about the tube and mandrel and apply pressure to the tube to emboss the longitudinally extending corrugations in the tube. This process is awkward to perform because of the necessity of employing an internal mandrel which is difficult to remove once the tubing has been embossed. Further, the use of an internal mandrel limits the length of the tube which can be embossed.

SUMMARY OF THE INVENTION

In accordance with this invention, a corrugated heat exchanger tubing has been designed having longitudinally extending corrugations and a longitudinally extending weld seam. A portion of the tube surface on both sides of the weld seam and coextensive therewith is left uncorrugated. This uncorrugated portion of the tube is comparatively narrow comprising less than 20% of the circumference of the tube.

Therefore, the tube does not lose any significant amount of heat exchange efficiency as compared to the tubing of U.S. Pat. No. 3,244,601. The tubing is markedly improved, however, in that it may be readily and inexpensively fabricated by a process and apparatus for welding metal strip into tubing.

In accordance with this invention, the process for forming the corrugated tubing comprises corrugating the metal strip to form the longitudinally extending corrugations and also to form longitudinally extending uncorrugated edge portions which are coextensive with and extend in from each of the longitudinal strip edges. The corrugated strip is formed into the shape of a tube by conventional means and the longitudinally extending edges of the as-shaped tube are welded together also by conventional means. Preferably, the welding operation employs high frequency welding.

The corrugating of the strip for welding into tubing in accordance with this invention may be performed off line or in line with the welding apparatus. Preferably, the corrugating is done by embossing.

The apparatus in accordance with this invention comprises supply means for supplying metal strip; means for forming longitudinally extending corrugations in the metal strip while leaving longitudinally extending edge portions uncorrugated, these edge portions extending inwardly from the longitudinally extending edges of the strip; tube forming means for forming the corrugated strip into the shape of a tube and welding means for joining the longitudinally extending edges of the strip to form a fluid and pressure tight tube. The apparatus may also include weld bead removing means, shaping and/or sizing means and other means for further processing.

It is accordingly an object of this invention to provide a heat exchanger tube having a tube wall with longitudinally extending corrugations, a longitudinally extending weld seam, and coextensive uncorrugated portions on both sides of the weld seam.

It is another object of this invention to provide a process for forming corrugations in metal strip and then forming tubing as above from the metal strip.

It is another object of this invention to provide an apparatus for forming corrugations in metal strip and for forming tubing as above from the thus corrugated metal strip.

Other objects and advantages will become apparent from the following description and drawings.

DETAILED DESCRIPTION OF THE PREFERRED EMBODIMENTS

Figure 1:
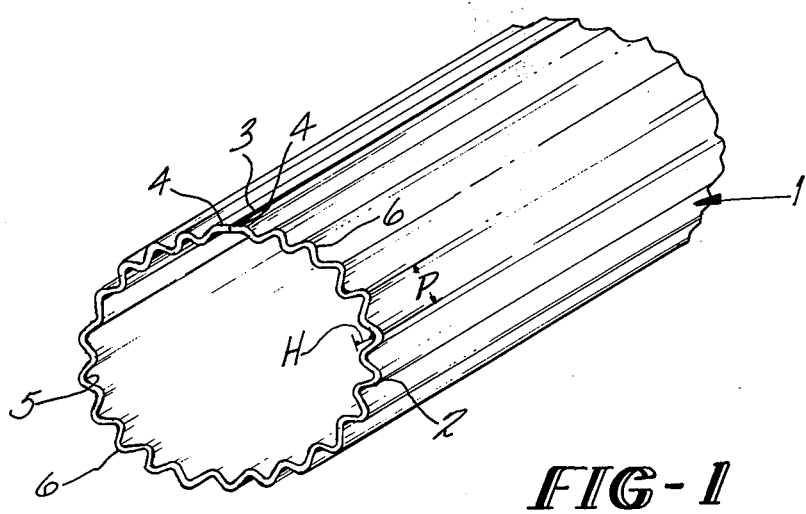
FIG. 1 is a perspective view of a heat exchanger tube in accordance with this invention.

Referring now to the drawings and especially to FIG. 1, there is illustrated a heat exchanger tube 1 in accordance with this invention. The tube 1 as shown includes longitudinally extending corrugations 2 similar to those described in U.S. Pat. No. 3,244,601.

In accordance with U.S. Pat. No. 3,291,704, granted Dec. 13, 1966, it is preferred that the corrugations 2 have a pitch P of from 0.050 inch to 0.500 inch and a height H of from 0.025 inch to 0.250 inch. However, contrary to the patent, it has been found in accordance with this invention that the tubing 1 may have a ratio of pitch P to height H varying from approximately 1:1 to approximately 3:1 throughout the range of dimensions of the pitch and height. As with the tubing of the referenced patent, the length of the tube should be at least 50 times greater than the height H.

The tube 1 of this invention is formed from strip 10 which is welded into tubing and, therefore, includes a longitudinally extending weld seam 3. On both sides of the weld seam 3 a portion 4 of the tube wall 5 coextensive with the weld seam and extending circumferentially outwardly therefrom is left uncorrugated. The reason for this will be described in more detail hereinafter.

These uncorrugated portions 4 of the tube wall 5 should have a combined width which is less than about 20% of the tube wall circumference as measured by a circle which would just enclose the peaks 6 of the corrugations 2 on the outside surface of the tube 1. More preferably, the combined width of these uncorrugated portions 4 should be less than 10% of the circumference of the tube as above defined. Preferably, the combined width is from about 0.015 inch to about 1 inch and, more preferably, from about 0.060 inch to about 0.200 inch depending on tube diameter.

Figure 3:
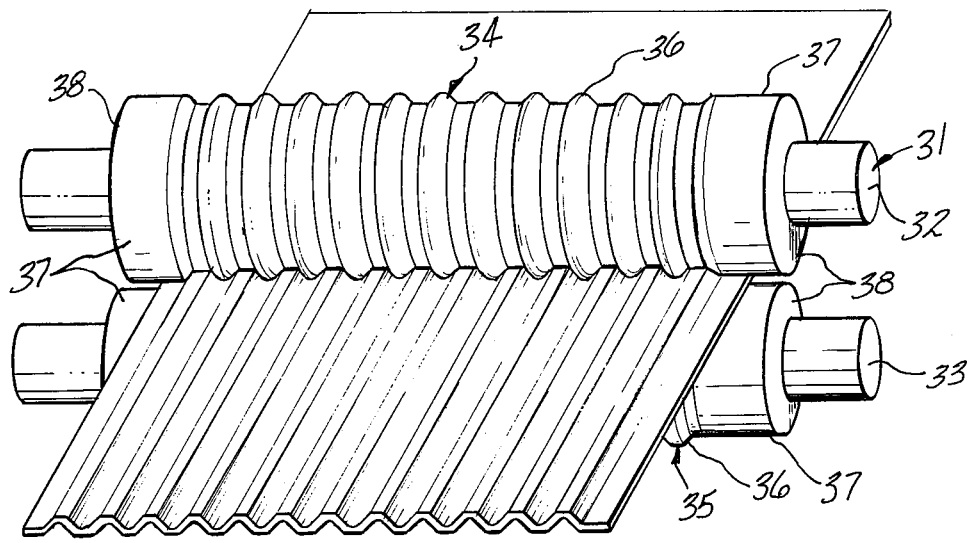
FIG. 3 is a perspective view illustrating roll embossment of corrugations in metal strip.
Figure 2:
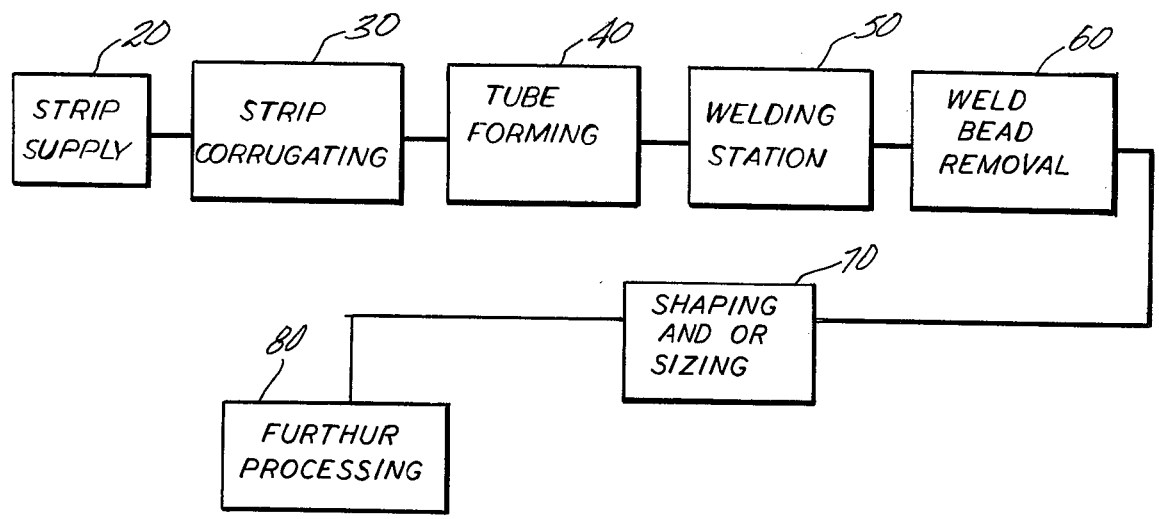
FIG. 2 is a schematic representation of an apparatus in accordance with this invention.

Referring to FIGS. 2 to 4, the process in accordance with this invention comprises providing a flat metal strip 10 followed by forming corrugations 2 in the metal strip while leaving uncorrugated edge portions 11 of the strip which are coextensive with and extend inwardly from the longitudinally extending free edges 12 of the strip. The sum of the widths of the uncorrugated portions 11 at both free edges 12 of the strip 10 should be less than 20% of the width of the strip as corrugated and, preferably, less than 10% of that width. Preferably the sum of the widths of the uncorrugated portions is from about 0.015 inch to about 1 inch and more preferably from about 0.060 inch to about 0.200 inch.

Preferably, the corrugations 2 are formed by embossing the strip 10 and more preferably, by roll embossing the strip as in FIG. 3. The strip 10 corrugated as above is formed into the shape of a tube by well known tube forming techniques. Generally, this comprises forming the strip 10 gradually into the shape of a tube by passing it through a series of conventional roll forming stands or dies (not shown). Since the corrugations 2 are longitudinally extending, linear contact is maintained between the roll forming stands and dies, thereby permitting the tube to be formed in this manner.

After the strip 10 has been formed into the shape of a tube, the longitudinally extending free edges 12 of the strip are joined together by welding, preferably, by high frequency welding such as by the high frequency forge welding process of U.S. Pat. No. 3,037,105. The tubing 1 thus formed may be subjected as desired to further shaping as, for example, to correct out to roundness and/or sizing. These operations may be carried out by conventional means.

The tube also may be further processed as, for example, it may be cleaned, coiled and/or packaged.

The apparatus for practicing the process in accordance with this invention and for forming the tubing in accordance with this invention is shown schematically in FIG. 2. The apparatus comprises supply means 20 or a supply of metal strip; strip corrugating means 30 for forming longitudinally extending corrugations 2 in the metal strip 10 while leaving longitudinally extending edge portions 11 uncorrugated; tube forming means 40 for forming the corrugated strip 10 into the shape of a tube; and welding means 50 for joining the longitudinally extending free edges 12 of the corrugated strip 10 to form a fluid and pressure tight tube.

The apparatus may also include weld bead removal means 60 for removing any weld bead (not shown) which might form on the outside and/or inside surfaces of the tube at the weld seam 3. In some circumstances, however, the amount of weld bead which is formed is insignificant and need not be removed, however, the outside diameter weld bead is preferably removed to facilitate further processing.

Shaping and/or sizing means 70 may be included as, for example, to correct out of roundness of the tube 1 and properly size it. The apparatus may also include means for further processing 80 the tube 1 as, for example, means 80 for cleaning the tube and means 80 for coiling the tube. The particular apparatus for carrying out each of these functions may be of any conventional well known design.

Supply means 20 generally comprises a supply of metal strip in the form of a coil. The tube forming means 40 generally comprises a plurality of in line tube forming roll stands or dies as are well known in the art. The welding means 50 in accordance with this invention preferably comprises, though it is not limited to, a high frequency forge welding station as set forth in U.S. Pat. No. 3,037,105. The weld bead removal means 60 generally comprises conventional I.D. and O.D. scarfing tools. The shaping and/or sizing means 70 generally comprises a series of in line roll stands or dies. The cleaning means 80 may be the one set forth in U.S. application Ser. No. 167,687, filed July 30, 1971. The coiling means 80 may be any conventional means for coiling tubing.

The means 30 for forming the longitudinally extending corrugations in the metal strip 10 while leaving longitudinally extending uncorrugated edge portions 11 preferably comprises means for embossing the strip and, more preferably, comprises a roll embossing means 31 as shown in FIG. 3.

FIG. 3 shows rolls 32 and 33 for embossing metal strip 10 wherein the operative surfaces 34 and 35 of the rolls contain a corrugated portion 36 which lies intermediate uncorrugated smooth portions 37 on opposing ends 38 of the rolls. The bottom roll 33 has a similar configuration to the top roll 32 except for the fact that the corrugated portions 36 are offset so that the rolls 32 and 33 intermesh. Therefore, when the strip 10 is passed between the rolls 32 and 33, the strip is embossed to form the longitudinally extending corrugated portions 2 and uncorrugated edge portions 11.

The frame or stand for holding and adjusting the rolls and means for driving the rolls are all conventional in the art and therefore, are not shown.

Figure 4A:
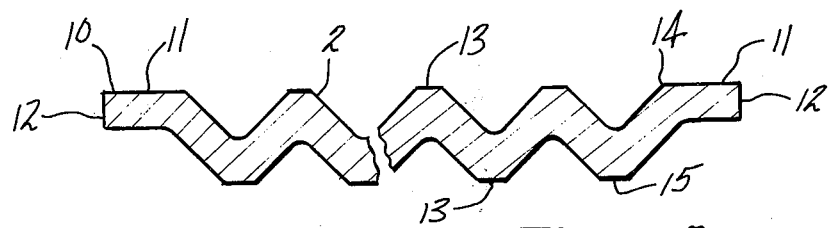
FIGS. 4a and 4b shows cross sections of the exemplary corrugated metal strip in accordance with this invention.
Figure 4B:
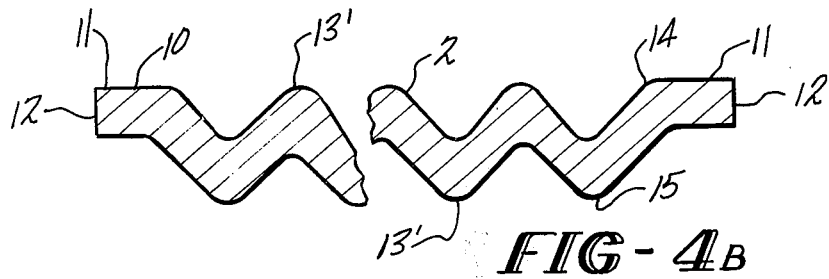

The particular shape of the corrugations may be set as desired as illustrated in FIG. 4. In FIG. 4A, the peaks 13 of the corrugations 2 have a flat shape whereas in FIG. 4B, the peaks 13' of the corrugations 2 are rounded. Other variations could readily be thought of and the particular shape of the corrugations 2 shown in FIGS. 3 and 4 is not meant to be limitive of the invention. Choice of a particular shape should be based primarily on maximizing heat exchange efficiency; however, other considerations may enter into the choice as, for example, adaptability to standard tube forming procedures. It is essential that the uncorrugated edge portions 11 of the strip 10 intercept the corrugated portions 2 of the strip substantially at the peak 13 of a corrugation 2 and, further, that each of the uncorrugated edge portions at the respective edges 12 of the strip intercept a peak 13 on the same side 14 or 15 respectively of the strip. This requirement is important because both uncorrugated edge portions 11 must contact the tube forming rolls and particularly the weld rolls to maintain alignment of the strip 10 edges 12 and these rolls contact only the peaks 13 of the strip 10.

In welding metal strip 10 into tubing 1, it is necessary to accurately align the strip edges 12 at the point of welding after the strip has been formed into the shape of a tube. When a corrugated surface 2 is present in the tube 1, the marked discontinuity presented by the corrugations 2 makes it difficult or impossible to achieve the alignment of the strip edges 12 as illustrated in FIG. 5.

Figure 5:
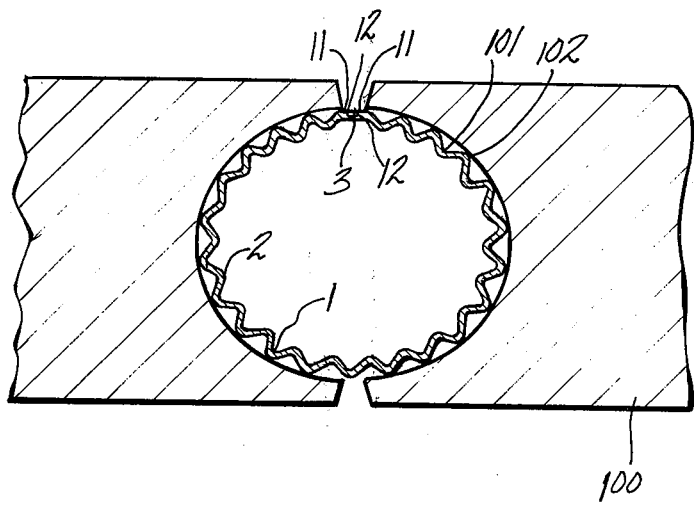
FIG. 5 shows a cross section of the welded tube of this invention and the weld rolls at the point of welding.

FIG. 5 illustrates one reason why it is necessary to provide the longitudinally extending edge portions 11 in the strip 10 which is to be formed and welded into tubing 1. This reason is to maintain the alignment of the strip edges 12 at the point of welding. FIG. 5 shows a cross section of the tube 1 at the point of welding and shows the contact between the weld rolls 100 and the strip surface. The longitudinally extending uncorrugated edge portions 11 provide a good surface for contacting the weld rolls 100 for maintaining the alignment of the strip edges 12.

As shown in FIG. 5, the weld rolls 100 maintain the alignment of the strip edges 12 by contacting the strip surfaces 11 adjacent to the strip edges. In accordance with this invention, these strip surfaces comprise the uncorrugated edge portions 11 which insure that the contact between the strip surfaces 11 and the weld rolls 100 is the same on both sides of the weld seam 3 so that accurate alignment is maintained.

If these longitudinally extending uncorrugated edge portions 11 were not present, it is probable that misalignment of the strip edges 12 or a complete lack of alignment of the strip edges would result. This is the case since the strip edge 12 on one side of the weld seam 3 could be at a valley 101 in the corrugated surface 2 whereas a strip edge 12 on the other side of the weld seam 3 could be at a peak 102 in the corrugated surface. The degree of misalignment would then be a function of the point at which the strip edge terminated in the respective corrugations. Such a problem is completely overcome in accordance with this invention by leaving longitudinally extending edge portions 11 of the strip 10 uncorrugated.

A further improvement which results from leaving the longitudinally extending edge portions 11 of the strip 10 uncorrugated is that any weld bead (not shown) which might form on the inside and/or outside surface of the tube 1 at the weld seam 3 is readily removed as by scarfing. The width of the uncorrugated edge portions 11 of the tube 1 after welding preferably is sufficient to permit conventional scarfing tools to be employed so as to remove the weld bead. If the tube did not contain the uncorrugated portions 11, removal of the inside and outside diameter weld beads would be difficult to achieve even if the strip edges had achieved a degree of alignment sufficient to be welded together.

The width of the uncorrugated edge portions 11 may be varied within the aforenoted ranges and is generally a function of the pitch P of the corrugations 2 for given tube diameters and is also dependent, if necessary, on the width required to provide clearance for scarfing of weld beads. Further, the combined width of the uncorrugated edge portions 11 of the strip 10 may be the same as or different from the combined width of the uncorrugated portions 4 of the tube 1. For example, the preferred welding process in accordance with this invention comprises forge welding wherein a portion of each of the uncorrugated edge portions 11 of the strip 10 at the strip edges 12 is melted. In turn the resulting molten metal and heat affected zone is squeezed out at the weld seam 3 so that the combined width of the uncorrugated portions 4 in the as-welded tube 1 is less than the combined width of the uncorrugated edge portions 11 in the original strip 10.

In other welding techniques, wherein metal is deposited to join the strip edges 12 together, it is possible that the combined width of the uncorrugated portions 4 would be greater than the combined width of the uncorrugated edge portions 11. It is further possible that these respective widths may be substantially the same.

It should also be recognized that the thickness of the tube wall 5 may vary in the corrugated portion 2 as compared to the uncorrugated portions 4 depending on the process of forming the corrugations. Further, these respective tube wall 5 thickness may be chosen as desired. The tube wall thicknesses shown in the Figures are uniform throughout; however, this is not meant to be limitive of the invention.

While the process disclosed herein has been described with reference to the preferred use of embossing for forming the corrugations, other forming methods could be employed, such as, for example, roll forming, stamping, swaging, etc.

This invention is preferably applicable to metal strip of steel, stainless steels, aluminum, aluminum base, copper, copper base alloys and nickel and nickel base alloys.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for continuously forming a corrugated heat exchanger tube comprising:

A. providing a supply of metal strip having opposed longitudinally extending edge portions with longitudinal free edges and opposed surfaces;

B. continuously embossing said strip to form longitudinally extending corrugations on both surfaces of the metal strip having peaks and valleys while leaving the opposed longitudinally extending edge portions of the strip uncorrugated, wherein said uncorrugated edge portions and the corrugated peak portions on one surface of said strip are on the same plane and the sum of the widths of the said edge portions comprises less than about 20% of the width of the strip as corrugated;

C. continuously forming said corrugated strip into the shape of a tube with the strip edges abutting and extending in a straight line along the longitudinal axis of the formed tube; and D. continuously welding said strip edges together, thereby continuously forming a fluid and pressure tight corrugated heat exchanger tube having a weld seam extending in a straight line along the longitudinal axis of the tube, corrugations parallel thereto and uncorrugated portions of the tube surface corresponding to the uncorrugated portions of said strip coextensive with the said weld seam on both sides thereof extending along the longitudinal axis of the tube.

2. A process according to claim 1 wherein said strip edges are welded by forge welding with a portion of the abutting edges being melted together.

3. A process according to claim 2 wherein said strip edges are welded together by high frequency forge welding.

4. A process according to claim 1 wherein the corrugations are formed by roll embossing.

5. A process according to claim 3 wherein the metal tube is formed of copper or a copper base alloy.

6. A process according to claim 1 wherein said strip is embossed to form corrugations extending along the longitudinal axis of the tube.

7. A process according to claim 1 further including the step of maintaining the alignment of said strip edges with weld rolls which contact the uncorrugated edge portions of the formed tube adjacent to the strip edges.

* * * * *